United States Patent [19]

Azevedo et al.

[11] Patent Number: 4,969,120
[45] Date of Patent: Nov. 6, 1990

[54] DATA PROCESSING SYSTEM FOR TIME SHARED ACCESS TO A TIME SLOTTED BUS

[75] Inventors: Michael J. Azevedo; Paul W. Hunter, both of San Jose; Donald J. Lang, Cupertino, all of Calif.

[73] Assignee: International Business Machines Corporation, Armonk, N.Y.

[21] Appl. No.: 310,406

[22] Filed: Feb. 13, 1989

[51] Int. Cl.$^5$ ............................................. G06F 9/00
[52] U.S. Cl. ............................ 364/900; 364/942.5; 364/950.5; 364/950; 364/941; 364/942.1
[58] Field of Search .................... 364/200, 900; 340/825.5; 370/85

[56] References Cited

U.S. PATENT DOCUMENTS

| 4,015,243 | 3/1977  | Kurpanek      | 364/200   |
| 4,237,534 | 12/1980 | Felix         | 364/200   |
| 4,257,095 | 3/1981  | Nadir         | 364/200   |
| 4,313,196 | 1/1982  | Oblonsky      | 370/85    |
| 4,470,114 | 9/1984  | Gerhold       | 364/200   |
| 4,499,538 | 2/1985  | Finger et al. | 364/200   |
| 4,560,985 | 12/1985 | Strecker et al. | 340/825.5 |
| 4,570,257 | 2/1986  | Olson et al.  | 370/85    |
| 4,593,282 | 6/1986  | Acampora et al. | 340/825.5 |
| 4,648,029 | 3/1987  | Cooper et al. | 364/200   |
| 4,698,746 | 10/1987 | Goldstein     | 364/200   |
| 4,703,420 | 10/1987 | Irwin         | 364/200   |
| 4,719,569 | 1/1988  | Ludemann et al. | 364/200 |

Primary Examiner—Gareth D. Shaw
Assistant Examiner—John G. Mills
Attorney, Agent, or Firm—Herb Somermeyer; Tom Berthold

[57] ABSTRACT

An access control or arbitrator for a shared resource, such as a time-slotted bus, groups requests according to priorities of the requests. The time slots are grouped into sets, each set having a number of successive time slots equal to the number of sources supplying access requests having a highest priority. In a highest priority group, each source supplying a highest priority access request is guaranteed access in respective ones of said time slots in each set of time slots. When any time slot is not being used by a high priority request, low priority requests then have access to the unused time slot. Lower priority groups of access requests are handled in accordance with a different algorithm, such as a round robin priority algorithm.

5 Claims, 3 Drawing Sheets

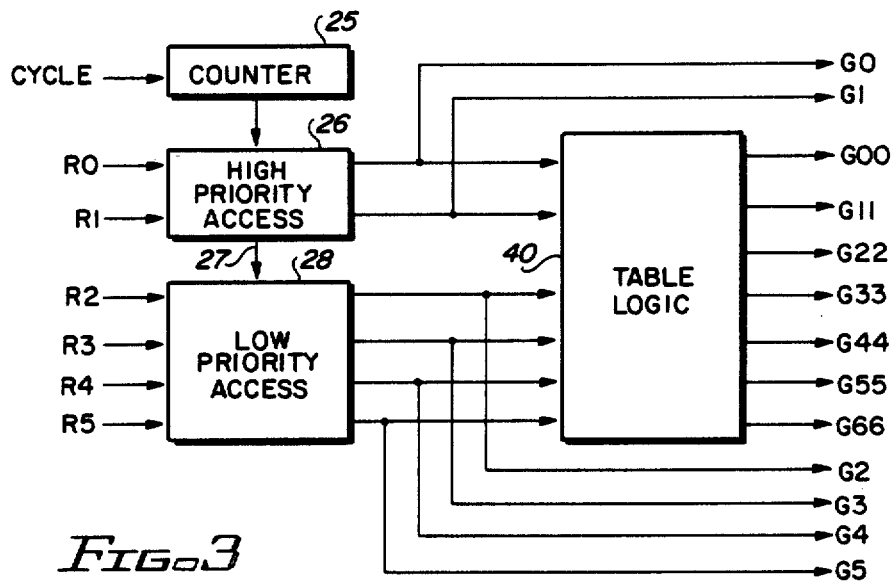
FIG. 3
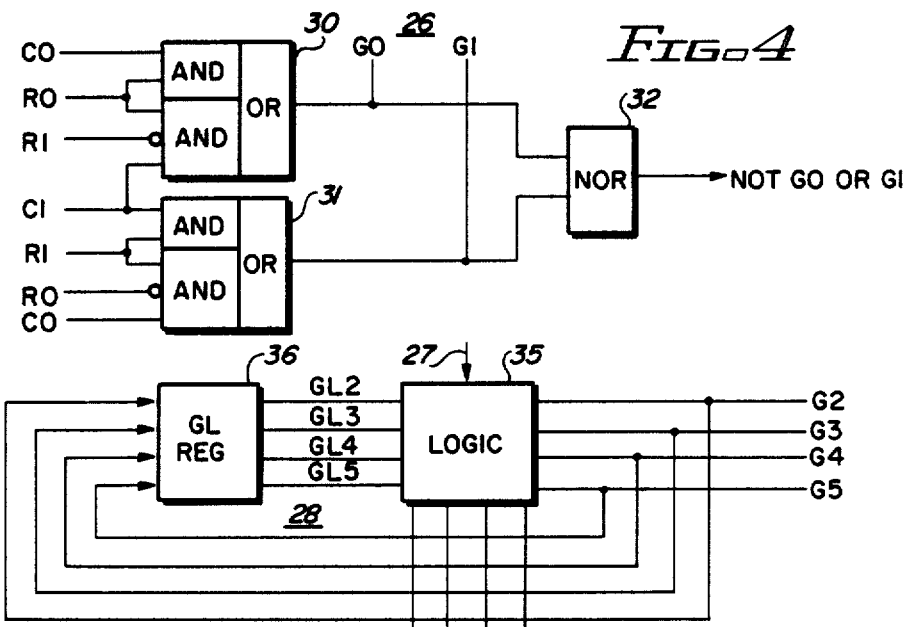
FIG. 4
FIG. 5
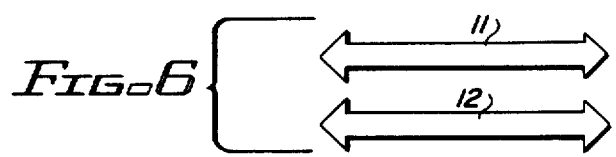
FIG. 6

4,969,120

DATA PROCESSING SYSTEM FOR TIME SHARED ACCESS TO A TIME SLOTTED BUS

FIELD OF THE INVENTION

The present invention relates to data processing machines, more particularly to arbitration controls for accessing time-shared data buses or other resources.

DISCUSSION OF THE PRIOR ART

The usage of time-shared resources has given rise to controlling or arbitrating the access to such resources. Various schemes of diverse complexity and logic have been devised and used in the past. Usually, the more complex a scheme is to obtain desired access controls, the more expensive or time-consuming the accessing becomes. It is desired to provide a balanced accessing among a plurality of resource users having differing groups of priorities and in which the prioritizing cost is minimized while maintaining rapid access to the resource. It is desired to "gaurantee" a predetermined access to a group of resource users having a highest priorty. For example, data transfers between a shared random access data buffer and a high performance disk data storage device, hereafter DASD, and all transfers travelling over a shared time-slotted bus requires guaranteed access to the bus and data buffer by the DASD. Such guaranteed access can ensure that the data transfers are not aborted because of an underrun or overrun wherein the DASD data storage disk has gone past the area on the disk related to the data transfer. Other users for the data bus must also be provided controlled access. It is desired to maximize bus utilization (i.e. maintain a maximum bandwidth) such that access to the bus and data buffer has a minimal access delay for all users and in accordance with an appropriate priority of access. In the described embodiment, an I/O controller, bus users are adapter circuits which operatively connect DASD and other data handling devices, such as host processor channels, to the data bus for communication with other adapters or the data buffer connected to the data bus. All of the above can provide an optimum throughput of an I/O controller.

A central bus arbitrator 21 is shown in Goldstein U.S. Pat. No. 4,698,746 which controls access to data bus extending between a plurality of data processors. Apparently the data bus is not time-slotted, i.e. once a data processor becomes a "bus master", it manages the bus in accordance with procedures not disclosed in this document. The patent does show a central arbitrator 21 connected to all of the bus connected data processors via an arbitration bus which is separate from the data transfer bus being controlled.

John W. Irwin in U.S. Pat. No. 4,703,420 shows a system for arbitrating use of an I/O bus by a co-processor and higher priority I/O units in which the co-processor automatically requests bus access in anticipation of its needs. Here a highest priority bus user is modified to request access ahead of the time of actual need. The present invention avoids this requirement for efficient operation.

SUMMARY OF THE INVENTION

It is an object of this invention to enable rapid access to a shared resource by any one of a first group of resource users while deferring access to a second group of resource users and for provided a maximal time utilization of the shared resource.

In apparatus for controlling access to a resource (such as a time-slot operated data bus) shared among a given plurality of user means and which is available during assignable time slots, an access control (such as a bus arbitrator) is connected to said resource and to each of said user means for receiving access requests from any of said user means and granting access to requesting ones of the user means for predetermined ones of said time slots. Prioritizing means in the access control means grants an exclusive or highest priortity access to the resource to a first plurality less than said given plurality of said user means. This highest priority includes granting first access to the resource during predetermined ones of the time slots to respective ones of the first plurality of user means. All of the other user means can gain access to the resource only when none of the first plurality of user means have requested access to the resource.

The foregoing and other objects, features, and advantages of the invention will be apparent from the following more particular description of preferred embodiments of the invention, as illustrated in the accompanying drawings.

DESCRIPTION OF THE DRAWINGS

FIG. 3 is a simplified diagrammatic showing of an access controller or arbitrator using the present invention and which can be used in the FIG. 1 illustrated system.

FIG. 4 is a logic diagram representation of a high priority access controlling portion of the FIG. 3 illustrated access controller.

FIG. 5 is a logic diagram representation of a lower priority access controlling portion of the FIG. 3 illustrated access controller.

FIG. 6 is an extremely simplified representation of a two-way or duplex data bus as used in the FIG. 1 illustration.

DETAILED DESCRIPTION

Figure 1:
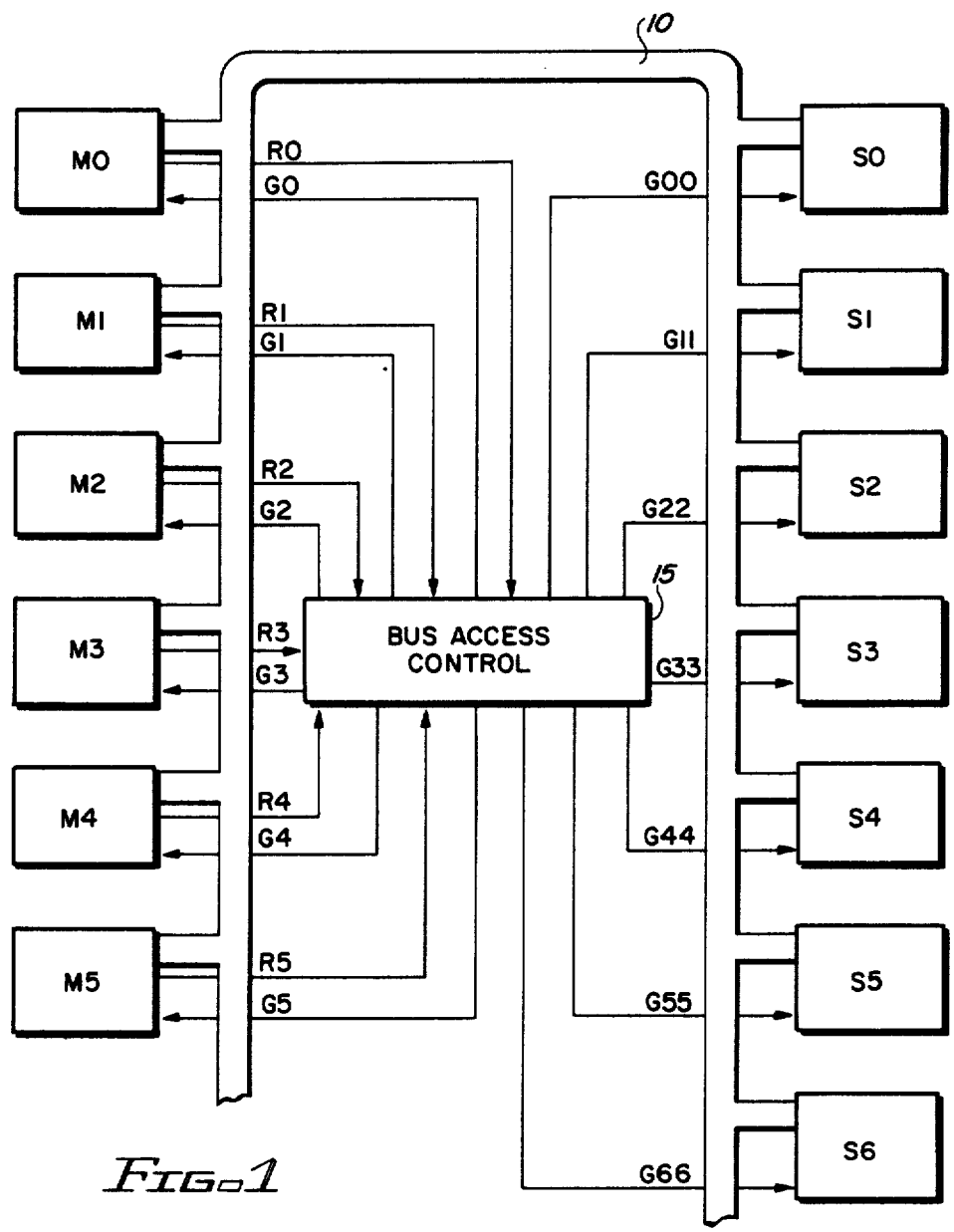
FIG. 1 is a block diagram of a system in which the present invention is advantageously practiced.

Referring now more particularly to the appended drawing, like numerals indicate like parts and structural features in the various figures. FIG. 1 shows a bus arbitration/resource access in which a master-slave relationship between the units connected to duplex data bus 10 are employed, no limitation thereto intended. Data bus 10 is constructed using known techniques in which a data transfer set of signal lines 11 (FIG. 6) are controlled by a set of tag lines 12. In FIG. 1 bus access prioritizing control or arbitrator 15 enables any one of the master units M0–M5 to access data bus 10 for accessing respective assigned ones of the slave units S0–S6, which in a constructed embodiment each slave unit is an addressable portion of a random access data buffer. One of the slave units is assigned to a one of the master units, such as S0 being assigned to M5, S1 being assigned to M0, S2 being assigned to M1, and the like. Note that one more slave unit is shown than master units. In some instances, it may be desired to have one slave unit, such as S5 monitor the data transfers between a master unit, such as M4 and its assigned slave unit S5. In each communication between a master unit and its assigned slave unit via data bus 10, the master unit acquires bus access permission (also often termed "bus ownership") and initiates the data transfer. The slave in that communication responds to the bus-acquiring master. Typically each communication consists of a time interrupted series of data transfers as is known in time-slotted access techniques. For example, if two kilobytes are to be transferred, each time slot access results in transferring a relatively small number of bytes, for example, 2, 4 or 8 bytes. The complete communication of two kilobytes requires a large number of access requests and resultant access grants to complete a typical data transfer.

Figure 2:
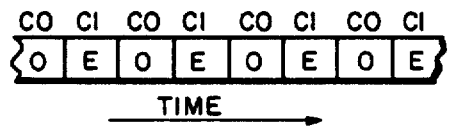
FIG. 2 is a diagrammatic showing of the operation of the data transfer bus shown in FIG. 1.

Data bus 10 utilizes time-slotted accesses as shown in FIG. 2. During each time slot, a small number, such as two, of data bytes can be transferred over the data bus. The time slots are grouped into sets, each set having a number of time slots equal to the number of master units which are to have highest access priority to the data bus. During each and every set of time slots, a one of the time slots in each set of time slots is to be guaranteed available to respective ones of the high priority master units. Master units M0 and M1 are the two highest priority units, these master units provide communication between DASD (not shown) and slave unit 16. Accordingly, each set has two time slots, even and odd, the even slot is always first available to M0 while the odd slot is always first available to M1; this means that in each set of time slots either of the master units M0 or M1 can obtain bus access, thence access to shared resource or data buffer 16. The time slots in each set of time slots are further identified as C0 and C1, respectively. Bus accessing is preferably pipelined in a three cycle pipeline. In such an arrangement, during a first time slot a master requests access to the bus access control or prioritizing arbitrator 15 for access to bus 10 during an upcoming time slot. During such first time slot another master may be actually transferring data while a second master may be completing a data transfer. The earliest time slot assignable to such requesting master is the next ensuing time slot; because of priorities and timing, a later time slot may be assigned. Once a time slot is assigned to the requesting master, a data transfer occurs in the assigned time slot and in the immediately folowing time slot some known "housekeeping" operations may be performed. It is desired and an advantage of this invention that each and every time slot available for using bus 10 can be used for transferring data.

Bus access control 15 receives access requests from master units M0-M5 respectively over the bus access request lines R0-R5. Bus access control 15 grants access to a given time slot by sending an access grant signal to one of the master units M0-M5 over its respective one of the grant lines G0-G5 and to its assigned slave unit(s), such as S2, over its respective one (G22) of the slave bus access grant lines G00-G66. For each time slot only one master unit M0-M5 is granted access; one or more of the slave units S0-S6 may be granted access. In a constructed embodiment, only one of the slave units S0-S6 were granted access in one time slot. Remember that each time a bus access is granted to a one of the master units M0-M5, a grant signal is supplied by bus access control 15 over a one of the slave unit bus access grant lines G00-G66 to alert the respective slave unit for the upcoming data transfer. The data transfer can be either from the master unit to its assigned slave unit or from the assigned slave unit to the master unit. In other embodiments of the invention, the slave units S0-S6 may be a portion of master units, i.e. a master unit can serve both as a master unit and as a slave unit. In this instance, the master unit serving as a master in the upcoming communication requests the bus access and the master unit which will act as a slave only receives a bus grant access as a slave unit. The bus access grant lines G0-G6 and G00-G66 carrying a grant indicating signal to the respective master and slave units for effecting the bus grant access.

FIG. 3 diagrammatically shows bus access or prioritizing control 15. Control 15 may be constructed in software or hardware form. For high speed operations, hardware form is preferred. Each cycle of machine operation, such as in an I/O controller, can be one cycle of data bus 10 operation, i.e. is one time slot of the data bus. Counter 25 counts the time slots of data bus 10; in the instant illustration, counter 25 is a modulo-2 counter (a trigger). Counter 25 supplies the time slot indications to high priority access circuits 26 for effecting the high priority access arbitration. The general logic of the bus access control is later detailed in FIGS. 4 and 5. R0-R5 respectively designate the master unit requests for access to a bus during one cycle of operation or one time slot. G0-G5 respectively designate the access grant to a respective master unit M0-M5 of a requested access; lines G00-G66 indicates the bus access lines to the respective slave units S0-S6 for indicating it will be in communication with its assigned master unit. Slave unit S0 is not necessarily assigned to master unit M0, etc. A grant during one cycle of bus operation gives access beginning with the next occurring cycle of operation or time slot. A high priortity access logic 26 grants bus accesss to the first plurality of master units M0 and M1 in response to the requests R0 and R1. If G0 and G1 is not issued, then a "not G0 or G1" signal is supplied over line 27 to the low priority access logic 28 which handles the low priority master units M2-M5.

The low priority access logic responds to the requests R2-R5 and the "not G0 or G1" signal to issue bus access grants G2-G5 respectively to M2-M5, as detailed in FIG. 5. The low access logic is a modified round robin algorithm.

Table logic 40 effects the assignment of the slave units S0-S6 to the master units M0-M5. The master bus-access grant lines G0-G5 are inputs to table logic 40. The slave bus-access grant lines G00-G66 are outputs from table logic 40. In hardware form, the table logic can be a gate array, can be a programmed logic array effecting the logical connections between the master bus-grant lines G0-G5 and the slave bus-grant lines G00-G66. Since logic gating is well known, by either hardware and software, table logic 40 is not further described. It is often not desired to pre-select the priority for a given communication and for a given master unit. To this end, table logic 40 is made software alterable using known techniques for selecting and altering the slave unit assignment to the master units. Alternately, a multiplexor may be inserted between all of the request lines R0-R5 and the logic 26,28 and between the logic 26,28 and the access grant lines G0-G5 and G00-G66.

FIG. 4 shows the high priority logic which solves the logic equation:

$$G_n = R_n * C_n \qquad (1)$$

where R is a request received from a master unit "n", "n" is the number of the requesting master unit (0 or 1). If equation (1) is not satisfied for either M0 and M1, then the "not G0 or G1" signal is issued. In the constructed embodiment, the time slots are grouped into sets of two time slots. M0 is guaranteed access to the first time slot in each set and M1 is guaranteed access to the second time slot in each set. The low priority master units M2-M5, as later described, obtain access to the time slots when the master units M0 or M1 do not request access for their respective guaranteed time slots. In an alternate arrangement suitable for a low performance bus, all time slots in each set of time slots can be guaranteed to any of the high priority master units; in such a situation, the requesting master unit should be able to withdraw an access request for allowing lower priority access to time slots.

In FIG. 4 two AND-OR circuits 30 and 31 are shown in solving the above equation respectively for M0 and M1. The NOR circuit 32 determines when neither G0 or G1 are issued. Clocking is not shown. In the AND-OR circuits 30 and 31 the AND portions 33 solve the term $R_n*C_n$ which is the equation (1) for guaranteeing access to a time slot for M0 and M1. AND portions 33 are only used in the preferred high performance embodiment of the invention. The AND portions 34 are added and used when a low performance bus is used as mentioned above. Portions 34 solve the equation $R_n*R_{n+1}'*C_{n+1}$ where "n+1" indicates the master unit M0 or M1 which is not guaranteed the current time slot; i.e. both master units M0 or M1 have high priority for both time slots. In a high performance access system, this arrangement can cause lockout of the lower priority master units M2-M5. The OR circuit portions provide the logic OR function +.

FIG. 5 shows the low priority logic which solves the bus arbitrage logic equation (2) below for each of the low priority master units M2-M5. The equation is generalized with the number "n" indicating which of the low priority master units using number designations 0-3 and the addition and substraction is modulus 4, i.e. 0=3 and 3+1=0 with answer always being an absolute value. GL indicates the last master unit receiving a grant, n is the number 0-3 (as above), R indicates a bus access request, ' means NOT, + means logic OR, * means logic AND, AND's are solved before OR's.

$$G_n = R_n \{GL_{n-1} + (R_{n-1}' * GL_{n-2}) + \\ ((R_{n-1}' + R_{n-2}') * GL_{n-3}) + \\ ((R_{n-1}' + R_{n-2}' + R_{n-3}') * GL_n)\} \quad (2)$$

The effect of the equation is as follows. The normal round robin priority is M2 M3 M4 M5. When M3 gets a bus access, then the next priority is M4 M5 M2 M3. Then if M5 gets a bus access, the next priority is M2 M3 M4 M5, etc.

In FIG. 5 the equation (2) is solved in the logic 35 only when the "not G0 or G1" signal is received in ANY ONE of the data bus cycles of operation. Timing is not shown. The inputs to the logic are R2-R5 and GL2-GL5. The outputs of G2-G5 go the requesting master unit and to logic 40 for notifying the assigned one of the slave units S0-S6 and also to readjust the GL REG register 36 contents by setting the granted master unit identification and resetting all other stages or positions of the register. That is, if G4 is issued, then GL4 is set and all other bit positions in GL REG 36 are reset. The round robin logic equation (2) defines the logic and is not detailed in the drawing as the equation identifies the logic operations.

Figure 7:
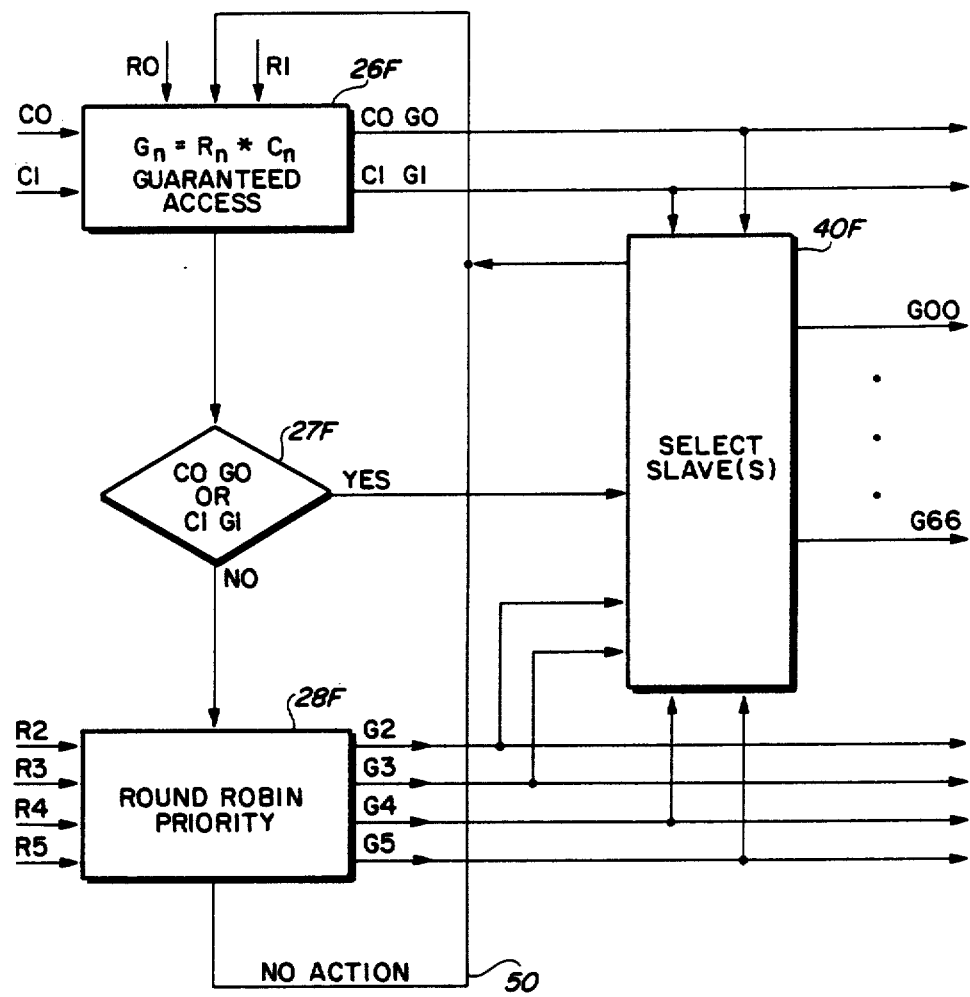
FIG. 7 is a flow chart of machine operations relating to FIGS. 1–6.

FIG. 7 is a flow chart showing the machine operations of the above-described system. The flow chart shows a continuing cycle of a bus 10 access granting operation, as will become apparent. A first set of operations 26F are performed in high priority access circuits 26 of FIG. 3 which solve the equation (1) for guaranteeing bus access to a first group M0, M1 of master units (FIG. 1). The bus access requests R0, R1 are matched, respectively, with time slots C0 and C1. Either R0 or R1 is always granted bus access in their respective bus time slots. If in any time slot, whether C0 or C1, a respective bus access request R0 or R1 is not received, then the time slot is available for lower priority bus access requests R2-R5 for a second group of master units M2-M5. This availabiltiy is determined in machine operation step 27F by examining the bus grants G0 or G1 in the respective time slots C0, C1, shown in FIG. 7 as C0G0 and C1G1 symbols. When step 26F has issued a bus access grant G0 or G1, no action is taken in step 27F; neither current time slot C0 or C1 is not available for the lower priority bus access requests. The absence of symbols C0G0 and C1G1 using equation (1) are detected in step 27F for providing a not-granted indication over line 27 (FIG. 3) to low priority access control 28 which performs machine operation step 28F. Machine operation step 28F solves equation (2) creating a modified round-robin bus access priority for master units M2-M5 only when a not-granted indication occurs in the high priority machine operations step 26F. If there are no requests R2-R5 received from masters M2-M5, then no action is taken as indicated by line 50. Line 50 indicates the continuing repetitive execution of steps 26F, 27F and 28F for examining and granting bus access requests. Each cycle preferably occurs once each cycle of bus operation, i.e. once in each C0 or C1 time slot.

If any of the access requests G0 through G5 are granted, then machine operations step 40F is performed by table logic 40 (FIG. 3). Table logic is set before the bus accessing occurs for matching the master units M0 through M5 with slave units S0 through S6. As stated above more than one slave unit can be granted access to bus 10 during any one time slot. The assigned slave unit to the requesting master unit is determined by known matching table logic operations. The match between the assigned slave unit S0-S6 with master units M0-M5 results in a bus access grant signal G00-G66 being sent to the assigned slave units S0-S6, respectively. Upon completion of the slave grant signal emission over the respective slave bus grant line G00-G66, line 50 returns the operation to step 26F. Note that the slave grant signals are generated in the same time slot in which steps 26F-27F created the bus access grant signals for the master units M0-M5.

While the invention has been particularly shown and described with reference to preferred embodiments thereof, it will be understood by those skilled in the art that various changes in form and details may be made therein without departing from the spirit and scope of the invention.

What is claimed is:

1. In apparatus for controlling access to a data bus having a given plurality of data ports, control means for repeatedly cycling the data bus operation in a series of data-transferring time slots, each cycle of data bus operation having a same predetermined series of all of said time slots, each of the data ports having a bus request line and a bus grant line, the improvement including, in combination:

first access means connected to a first plurality of said data ports via said bus request lines and bus grant lines, respectively, for receiving bus requests and sending bus grants for bus accesses to ones of the first plurality of data ports requesting a bus access during a perdetermined one of the time slots on a top priority basis and means in the first access means for granting access to said time slots to predetermined ones of said first plurality of data ports in accordnance with a first prioritizing algorithm which guarantees access by each of said first plurality of date ports to a predetermined one of said data-transferring slots in each said cycle of bus operation, respectively;

no-grant means in the first access means responsive to the first access means not granting access to any of said first plurality of data ports for said predetermined one time slot for generating and supplying a no-grant indication for said predetermined times slot; and second access means connected to a second plurality of said ports other than said first plurality of ports via the bus request lines and the bus grant lines, respectively, and being connected to said no-grant means for responding to said no-grant indication to grant, in accordance with a second prioritizing algorithm from said first prioritizing algorithm, to send a bus grant for said predetermined time slot to a one of the second plurality of said data ports without any gurantee of bus access to any one of the second plurality of data ports in any one of said cycles of bus operation.

2. In the apparatus set forth in claim 1 further including, in combination:

a third plurality of third ports connected to the bus and connected to the first and second access means only by a bus grant line;

each of said bus requesting data ports being a master port for controlling communication over the bus with said third ports, respectively, in which the third port responds to the bus control signals of the respective data port during said predetermined time slot for effecting data communications.

3. In the apparatus set forth in claim 2, further including, in combination:

said first or second access means operative when supplying a grant signal over any one of said grant lines to a one of said data ports to simultaneously supply a grant signal over another one of said grant lines to a one of the third ports for establishing said one third port as a slave port for data communications during said predetermined time slot.

4. In the apparatus set forth in claim 3, further including, in combination:

said first access means assigning each one of said first plurality of data ports to one and only one of said time slots in each of said cycles of bus operation.

5. In the apparatus set forth in claim 3, including, in combination:

said first access means assigning each one of said first plurality of data ports to one of said time slots in every cycle of bus operation having the same relative timing to all other time slots in each cycle of bus operation such that each of said data ports can transfer data in one and only one of the time slots in any one cycle of bus operations.

* * * * *